US010601787B2

(12) United States Patent
Pritikin et al.

(10) Patent No.: US 10,601,787 B2
(45) Date of Patent: Mar. 24, 2020

(54) ROOT OF TRUST OF GEOLOCATION

(71) Applicant: Cisco Technology, Inc., San Jose, CA (US)

(72) Inventors: Max Pritikin, Boulder, CO (US); Rafael Mantilla Montalvo, Raleigh, NC (US); Chris Allen Shenefiel, Williamsburg, VA (US)

(73) Assignee: Cisco Technology, Inc., San Jose, CA (US)

( * ) Notice: Subject to any disclaimer, the term of this patent is extended or adjusted under 35 U.S.C. 154(b) by 209 days.

(21) Appl. No.: 15/174,350

(22) Filed: Jun. 6, 2016

(65) Prior Publication Data

US 2017/0353435 A1     Dec. 7, 2017

(51) Int. Cl.
*H04L 29/06*    (2006.01)
*H04W 4/029*    (2018.01)
(Continued)

(52) U.S. Cl.
CPC .......... *H04L 63/0428* (2013.01); *G06F 21/44* (2013.01); *G06F 21/57* (2013.01);
(Continued)

(58) Field of Classification Search
CPC ............... H04L 63/0428; H04L 9/3263; H04L 63/0823; G06F 21/44; G06F 21/57
(Continued)

(56) References Cited

U.S. PATENT DOCUMENTS 7,860,516 B2 * 12/2010 Hodges ................... H04W 8/22
455/456.1

9,100,188 B2    8/2015 Spiers et al.
(Continued)

FOREIGN PATENT DOCUMENTS

WO    2015030788 A1    3/2015

OTHER PUBLICATIONS

Navmani, "Trust based Secure Reliable Route Discovery in Wireless Mesh Networks", KSII Transactions on Internet & Information Systems, Jul. 2019, pp. 3386-3411 (Year: 2019).*
(Continued)

*Primary Examiner* — Alexander Lagor
*Assistant Examiner* — Gregory A Lane
(74) *Attorney, Agent, or Firm* — Edell, Shapiro & Finnan, LLC

(57) ABSTRACT

A root-of-trust of geolocation is provided for an apparatus that includes a trust anchor module with a cryptographic processor and a secure memory. The apparatus further includes a main processor coupled to the trust anchor module and configured to receive a digital geolocation certificate, the geolocation certificate including information identifying the apparatus, information regarding a physical location of the apparatus, information identifying an authorized entity that has verified the physical location of the apparatus, and a digital signature of the authorized entity. The main processor is further configured to cause the trust anchor module to store the digital geolocation certificate in the secure memory such that the digital geolocation certificate is cryptographically bound to the apparatus. The trust anchor module may also include, or otherwise communicate over a secure channel with, a movement sensor associated with the apparatus.

21 Claims, 4 Drawing Sheets

(51) Int. Cl.
  *H04L 9/32*    (2006.01)
  *G06F 21/57*   (2013.01)
  *G06F 21/44*   (2013.01)
  *H04L 9/08*    (2006.01)
  *G06Q 30/00*   (2012.01)

(52) U.S. Cl.
  CPC ......... *G06Q 30/018* (2013.01); *H04L 9/0872* (2013.01); *H04L 9/3263* (2013.01); *H04L 63/0823* (2013.01); *H04L 63/126* (2013.01); *H04W 4/029* (2018.02); *G06F 2221/2111* (2013.01)

(58) Field of Classification Search
  USPC ........................................................ 713/156
  See application file for complete search history.

(56) References Cited

U.S. PATENT DOCUMENTS

| | | | |
|---|---|---|---|
| 9,130,837 B2 | 9/2015 | Bjarnason et al. | |
| 2003/0074556 A1* | 4/2003 | Chapman | H04L 63/08 713/157 |
| 2008/0182592 A1* | 7/2008 | Cha | H04L 63/04 455/456.3 |
| 2009/0037727 A1 | 2/2009 | Pritikin | |
| 2010/0306533 A1* | 12/2010 | Phatak | G06F 21/34 713/156 |
| 2012/0159156 A1* | 6/2012 | Barham | G06F 21/6218 713/156 |
| 2014/0171126 A1* | 6/2014 | Mayor | G01S 5/14 455/456.6 |
| 2014/0274136 A1* | 9/2014 | Edge | H04W 4/04 455/456.2 |
| 2014/0297629 A1* | 10/2014 | Lin | G06F 16/78 707/724 |
| 2016/0065589 A1 | 3/2016 | Leighton et al. | |
| 2019/0005224 A1* | 1/2019 | Oliver | G06F 21/57 |

OTHER PUBLICATIONS

International Search Report and Written Opinion in counterpart International Application No. PCT/US2017/035123, dated Sep. 1, 2017.

Erin K. Banks et al., "Trusted Geolocation in the Cloud: Proof of Concept Implementation (Draft)", NIST Interagency Report 7904, pp. 1-42, Dec. 31, 2012.

Sangster, et al., "Network Endpoint Assessment (NEA): Overview and Requirements," Network Working Group, Informational, Request for Comments: 5209, Jun. 2008, 53 pages.

* cited by examiner

ROOT OF TRUST OF GEOLOCATION

TECHNICAL FIELD

The present disclosure relates to the field of trusted data geolocation in network environments.

BACKGROUND

Trusted data geolocation in the cloud is becoming an increasingly important problem, driven by incompatible legislation in different jurisdictions and compliance requirements of data owners. The physical location of data storage and processing in cloud environments matters for several reasons. For example, tax rates may differ based on where a transaction is conducted (rather than where the entity is registered). Also, compliance rules or privacy laws may require that certain categories of data are not stored or processed in a different jurisdiction, and organizations with geographically distributed field offices might conduct operations—such as certain types of research (e.g., stem cell research)—which are legal is some countries and illegal in other countries. Furthermore, recent innovations in data center design—such as so-called 'modular data centers'—improve the mobility of data centers, allowing data center modules to be easily moved across large distances using standard modes of transportation. Existing geolocation techniques can be inconsistent and rely on methods that can be subverted. Thus, there is a need for improvements in trusted data geolocation.

DESCRIPTION OF EXAMPLE EMBODIMENTS

Overview

A root-of-trust of geolocation is provided for an apparatus that includes a network interface configured to enable network communications. The apparatus includes a trust anchor module with a cryptographic processor and a secure memory. The apparatus further includes a main processor coupled to the network interface unit and the trust anchor module and configured to receive, via the network interface unit, a digital geolocation certificate, the geolocation certificate including information identifying the apparatus, information regarding a physical location of the apparatus, information identifying an authorized entity that has verified the physical location of the apparatus, and a digital signature of the authorized entity. The main processor is further configured to cause the trust anchor module to store the digital geolocation certificate in the secure memory such that the digital geolocation certificate is cryptographically bound to the apparatus. The trust anchor module may also include, or otherwise communicate over a secure channel with, a movement sensor associated with the apparatus. The trust anchor module may take certain actions when measurements from the sensor exceed a predetermined threshold. The apparatus may also obtain estimates of its physical location based on communications with external sources, such as trusted ping servers, Global Positioning System (GPS) satellites, cell towers, and/or wireless access points, and the trusted anchor module may store the location information in geolocation logs that may be provided to an authorized entity, along with the signed geolocation certificate bound to the apparatus, in response to a request or at other times.

Example Embodiments

Figure 1:
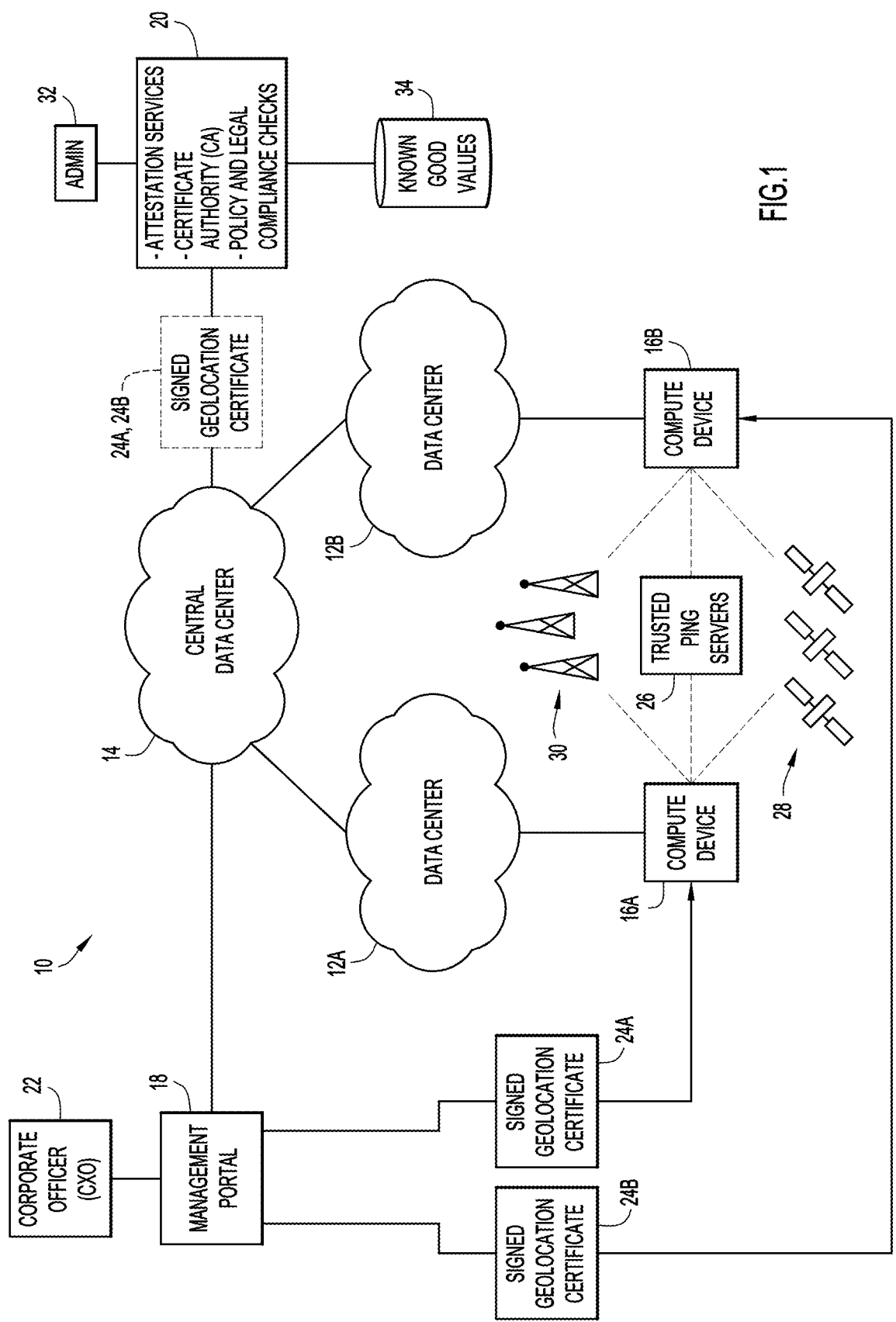
FIG. 1 is a block diagram of an example network environment in which root-of-trust of geolocation techniques may be implemented in accordance with an example embodiment.

FIG. 1 is a block diagram of a network environment 10 in which a root-of-trust of geolocation according to an exemplary embodiment can be implemented. In network environment 10, a plurality of (e.g., two) remote data centers 12A and 12B at different physical locations are connected to a central data center 14. Each data center includes at least one compute device. For example, in FIG. 1, data center 12A includes a compute device 16A, and data center 12B includes a compute device 16B. The compute devices 16A and 16B in data centers 12A and 12B, respectively, can include network elements such as routers, gateways, firewalls, switches, servers, or any other type of computing device whose physical location may be important. Although two remote data centers are shown, it will be appreciated that the network environment can include as few as one remote data center or as many as two or more data centers. It will also be appreciated that each data center may comprise a single compute device or a network of compute devices.

In example embodiments, techniques for enabling a root-of-trust of geolocation for compute devices may be implemented in network environment 10 by providing a node 18 hosting a management portal and a node 20 hosting administrative services such as attestation services, certificate authority services, and/or policy and legal compliance checks. Each of these nodes may include a server, a desktop computer, a laptop computer, a personal digital assistant (PDA), a smart phone, or any other type of computing device suitable for hosting such services. Generally, such computing devices may include a processor, a network interface for enabling network communications, and a non-transitory memory storing instructions executable by the processor to perform the operations described herein.

The management portal at node 18 may be configured to communicate with compute devices directly and/or via the network. Typically, the management portal is secured for access by an authorized representative 22 of an entity (e.g., business enterprise, government organization, nonprofit organization, educational organization, research organization, etc.) associated with the compute device 16A and 16B. For example, an entity can be associated with a compute device if it owns, controls, or otherwise legitimately exercises authority over and/or makes decisions regarding the compute device. Entities may buy, lease, license, or otherwise acquire compute devices from a manufacturer, in accordance with this disclosure. An example of an authorized representative of an entity is a corporate officer (CXO) of the entity.

In an embodiment, the management portal 18 may be configured to allow an authorized representative 22 to certify the location of a compute device (e.g., one of compute devices 16A or 16B) containing a trust anchor module, such as a Trusted Computing Group Trusted Platform Module (TPM) chip or a Cisco System's Anti-Counterfeit Technology (ACT2) chip, that performs cryptographic operations and provides secure, tamper-resistant data storage for cryptographic keys, digital certificates, etc. For example, in an exemplary embodiment, the management portal 18 may be configured to accept, from an authorized representative 22, location information (such as latitude and longitude) for a compute device 16A or 16B, and to send the location information and cryptographic credentials to other nodes in the network, such as the compute device and/or the administrative portal 20, for generation of a signed geolocation certificate 24A or 24B, respectively, and other operations. The certificate 24A or 24B may be in the form of a Cryptographic Message Syntax x.509 certificate, or any other signed statement sufficient to provide non-repudiation for the authorized representative's statement concerning geolocation. For example, the signed statement could include the following:

{root-of-trust for geolocation identity, geolocation information, source of certification, signature on certification}.

In exemplary embodiments, the root-of-trust for geolocation may be a geolocation certificate stored in a TPM or an ACT2 trust anchor module, the source of certification may be the name of the authorized representative, and the signature may be a digital signature using credentials issued to the authorized representative. In an embodiment, the signed digital geolocation certificate is stored in the secure memory of the trust anchor module such that the certificate is cryptographically bound to the compute device. For example, the cryptographic processor of the trust anchor module may be configured to store the certificate in a manner that renders the certificate immutable (i.e., does not allow the certificate to be surreptitiously altered or replaced).

In addition to the certified location information from the management portal 18, the physical location of a compute device may be independently determined by the compute device based on its distance from external sources. For example, network latency measurements from the compute device to trusted ping servers 26 may be used to determine the location of the compute device. In another example, signals from GPS satellites 28 may be used to determine the compute device location. In yet other examples, location may be determined/measured using wireless wide area network cell towers or wireless local area network access points (e.g., Wi-Fi) 30 may be used. Furthermore, one or more of the foregoing methods may be combined to determine the physical location of a compute device. In an exemplary embodiment, one or more physical location measurements based on external sources may be performed by the compute device.

In an embodiment, geolocation information from external measurements is protected from tampering by the trust anchor module, for example, by only allowing additional geolocation inputs using an "extend" operation in which a privilege process authenticates itself with the root-of-trust of geolocation to "extend" current inputs, stored internally, with new inputs. In an embodiment, there is no facility, short of resetting the chip, to "move" the extended geolocation information. Each additional input updates a geofence description of the location of the root-of-trust of geolocation. In an embodiment, the geofence description may be a geographic point and a radius, calculated by a trusted process. In an embodiment, an application programming interface (API) for the trust anchor module may allow the geofence to be optimized by including additional point/radius pairs. For example, the trust anchor module may be programmed to record each point/radius provided or otherwise obtained and report the entire logged history for a relying party to parse. In an embodiment, the logs may be stored outside the trust anchor module so long as they are adequately protected, e.g., using cryptographic techniques.

Administrative services node 20 may be configured to communicate with the management portal 18 and the compute devices 16A and 16B over the network. In an exemplary embodiment, the administrative services node 20 may be configured to perform certain cryptographic operations such as encryption/decryption, verifying identity using public/private keys, generating a signed geolocation certificate, and performing attestation services. In an embodiment, the administrative services node 20 may be coupled to a database 34 of known good values for purposes of performing attestation services. Administrative services node 20 may also be configured to perform policy and legal compliance checks with respect to a compute device's location, either automatically or at the request of a system administrator 32 with authorized access to the node. The administrative services node 20 may also be configured to notify responsible personnel (e.g., by sending a message over the network) in the event it is determined that the location of a compute device is not in compliance with the entity's policies or legal requirements. It will be appreciated that the attestation services, certificate authority services, and policy and legal compliance checks need not be hosted at the same node.

It will be appreciated that network environment 10 represents a series of points or nodes of interconnected communication paths for receiving and transmitting packets of information that propagate through the system. The nodes of FIG. 1 may be coupled to one another through one or more interfaces employing any suitable connection (wired or wireless), which provides a viable pathway for electronic communications. Network environment 10 can include any local area network (LAN), wireless local area network (WLAN), metropolitan area network (MAN), Intranet, Extranet, wide area network (e.g., WAN), virtual local area network (VLAN), virtual private network (VPN), or any other appropriate architecture or system that facilitates communications in a network environment, or any combination of the foregoing.

Network environment 10 may include a configuration capable of transmission control protocol/Internet protocol (TCP/IP) communications for the transmission or reception of packets in a network. Network environment 10 may also operate in conjunction with a user datagram protocol/IP (UDP/IP) or any other suitable protocol where appropriate and based on particular needs. Additionally, any one or more of the nodes in FIG. 1 may be combined or removed from the architecture based on particular configuration needs. In an embodiment, communications between the compute devices 16A and 16B and authorized entities such as the management portal 18 and the administrative portal 20 may employ Transport Layer Security (TLS), or Secure Sockets Layer (SSL), or any other cryptographic protocols that provide communications security over a computer network.

It should be understood that while an example network 10 has been shown and described herein, the system and method of the present disclosure may be implemented in any network environment capable of supporting the disclosed operations. Accordingly, the description with reference to network environment 10 should be not be construed to imply architectural limitations, but rather, should be construed as illustrative.

Figure 2:
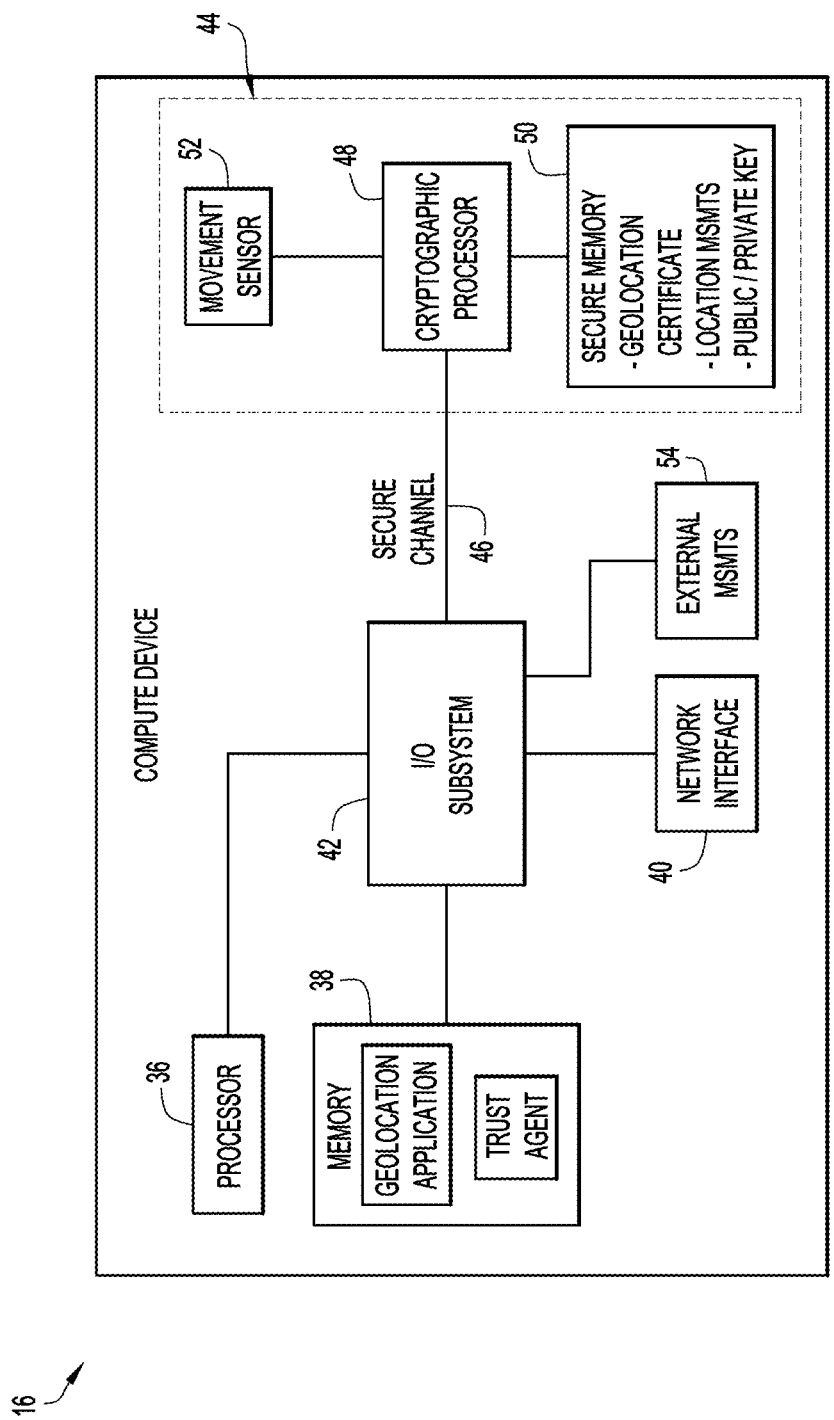
FIG. 2 is a block diagram showing a compute device configured to perform the root-of-trust of geolocation techniques, according to an example embodiment.

FIG. 2 illustrates an exemplary compute device 16 for which a root of trust of geolocation may be established using the techniques described herein. The compute device 16 may be programmed to implement a network element such as a router, gateway, firewall, switch, server, or any other type of computing device whose physical location may be important. The compute device 16 includes a main processor 36 for processing information, a main memory 38 for storing information and instructions to be executed by the main processor, a network interface unit 40 configured to enable network communications with external computing devices, and an input/output (I/O) subsystem or bus 42 for communicating information between the main processor, the main memory, and the network interface unit. The compute device 16 also includes a trust anchor module 44 connected to the I/O subsystem or bus 42 over a secure channel 46 that cannot be accessed without appropriate cryptographic credentials. In an embodiment, compute device 16 may also include an external measurement unit 54, such as a GPS unit, a cellular communications unit, or a wireless (e.g., WiFi) communications unit, that receives information from external sources (e.g., GPS satellites, cell towers, wireless access points, respectively) from which it is possible to determine a current physical location of the compute device. Information from external sources, such as trusted ping servers, that may be relevant to a current physical location of the compute device 16 may also be obtained via the network interface unit 40.

The trust anchor module 44 includes a cryptographic processor 48 for performing cryptographic operations, a secure memory 50 for storing cryptographic information and instructions to be executed by the cryptographic processor, and a sensor 52 for measuring possible changes in environment or conditions indicating that the geolocation might have changed. The trust anchor module 44 is preferably permanently secured to the compute device to prevent removal. For example, if the trust anchor module 44 is implemented as a chip, the chip may be soldered to the main circuit board of the compute device 16. In an exemplary embodiment, the sensor 52 may be a movement sensor, such as an accelerometer. In embodiments, the sensor 52 may be integrated as part of the trust anchor module 44 or the sensor may be a separate component that communicates with the trust anchor module via a secure channel.

In an embodiment, the instructions stored in the trust anchor module 44, when executed by the cryptographic processor 48, may cause a signed digital geolocation certificate to be stored in the secure memory 50 of the trust anchor module such that the certificate is cryptographically bound to the compute device. For example, the cryptographic processor 48 of the trust anchor module 44 may be configured to store the certificate in a manner that renders the certificate immutable (i.e., does not allow the certificate to be surreptitiously altered or replaced once it is placed in the secure memory of the trust anchor module). However, in an embodiment, the processor may be instructed to allow the trust anchor module to be reset by an authorized entity having appropriate cryptographic credentials, thereby invalidating the existing geolocation certificate and allowing insertion of a new geolocation certificate. Such a reset operation could be useful if, for example, the compute device is transferred to a new owner who will be utilizing the device at a different location. The trust anchor module 44 may also include instructions which, when executed by the cryptographic processor, perform cryptographic operations such as generating random numbers, managing public/private key pairs, encrypting and decrypting, hashing, etc.

While FIG. 2 shows a single main processor 36 and a single cryptographic processor 48, it should be understood that either or both of these processors may include a plurality of processing cores, each of which can perform separate processing. The main memory 38 and secure memory 50 can each be any kind of memory device, such as read only memory (ROM), random access memory (RAM), magnetic disk storage media devices, optical storage media devices, flash memory devices, electrical, optical, or other physical/tangible memory storage devices. Thus, in general, the memory 38 and 50 may each comprise one or more tangible (non-transitory) computer readable storage media (e.g., a memory device) encoded with software comprising computer executable instructions and when the software is executed (by the main processor or the cryptographic processor, respectively) it is operable to perform the operations described herein. For example, the compute device performs the operations described below in connection with FIG. 3 when executing the trust agent and geolocation application software stored in memory 38. Furthermore, trust anchor module 44 may include separate memory portions for storing executable instructions and data necessary for cryptographic operations, respectively. In addition, the memory devices 38 and 50 may be used for storing temporary variables or other intermediate information during the execution of instructions by the processors.

The compute device 16 performs a portion or all of the processing steps of the process in response to the processor executing one or more sequences of one or more instructions contained in a memory, such as the main memory 38. Such instructions may be read into the main memory 38 from another computer readable medium, such as a hard disk or a removable media drive. One or more processors in a multi-processing arrangement may also be employed to execute the sequences of instructions contained in main memory 38. In alternative embodiments, hard-wired circuitry may be used in place of or in combination with software instructions. Thus, embodiments are not limited to any specific combination of hardware circuitry and software.

Stored on any one or on a combination of non-transitory computer readable storage media, embodiments presented herein include software for controlling the compute device 16, and for enabling the compute device to perform the root of trust of geolocation techniques described herein. For example, the compute device 16 can be configured to attest to the configuration of the compute device to external entities, using cryptographically secured information (e.g., a signed geolocation certificate) from the trust anchor module 44. Such software may include, but is not limited to, operating systems, device drivers, and applications software. Such computer readable storage media further includes a computer program product for performing all or a portion (if processing is distributed) of the processing presented herein.

The computer instructions described herein may be any interpretable or executable code mechanism, including but not limited to scripts, interpretable programs, dynamic link libraries (DLLs), Java classes, and complete executable programs. Moreover, parts of the processing may be distributed for better performance, reliability, and/or cost.

As noted above, the compute device 16 may also include a network interface 40 coupled to a bus 42. The network interface 40 provides a two-way data communication coupling to a network link that is connected to, for example, a local area network (LAN), or to another communications network such as the Internet. For example, the network interface may be a wired or wireless network interface card to attach to any packet switched (wired or wireless) LAN. As another example, the communication interface may be an asymmetrical digital subscriber line (ADSL) card, an integrated services digital network (ISDN) card or a modem to provide a data communication connection to a corresponding type of communications line. Wireless links may also be implemented. In any such implementation, the communication interface sends and receives electrical, electromagnetic or optical signals that carry digital data streams representing various types of information.

The network link typically provides data communication through one or more networks to other data devices. For example, the network link may provide a connection to another computer through a LAN or through equipment operated by a service provider, which provides communication services through a communications network. The local network and the communications network use, for example, electrical, electromagnetic, or optical signals that carry digital data streams, and the associated physical layer (e.g., CAT 5 cable, coaxial cable, optical fiber, etc.). The signals through the various networks and the signals on the network link and through the network communication interface 40, which carry the digital data to and from the compute device 16 may be implemented in baseband signals, or carrier wave based signals. The baseband signals convey the digital data as unmodulated electrical pulses that are descriptive of a stream of digital data bits, where the term "bits" is to be construed broadly to mean symbol, where each symbol conveys at least one or more information bits. The digital data may also be used to modulate a carrier wave, such as with amplitude, phase and/or frequency shift keyed signals that are propagated over a conductive media, or transmitted as electromagnetic waves through a propagation medium. Thus, the digital data may be sent as unmodulated baseband data through a "wired" communication channel and/or sent within a predetermined frequency band, different than baseband, by modulating a carrier wave. The compute device 16 can transmit and receive data, including program code, through the network(s) via the network communication interface 40.

Figure 3:
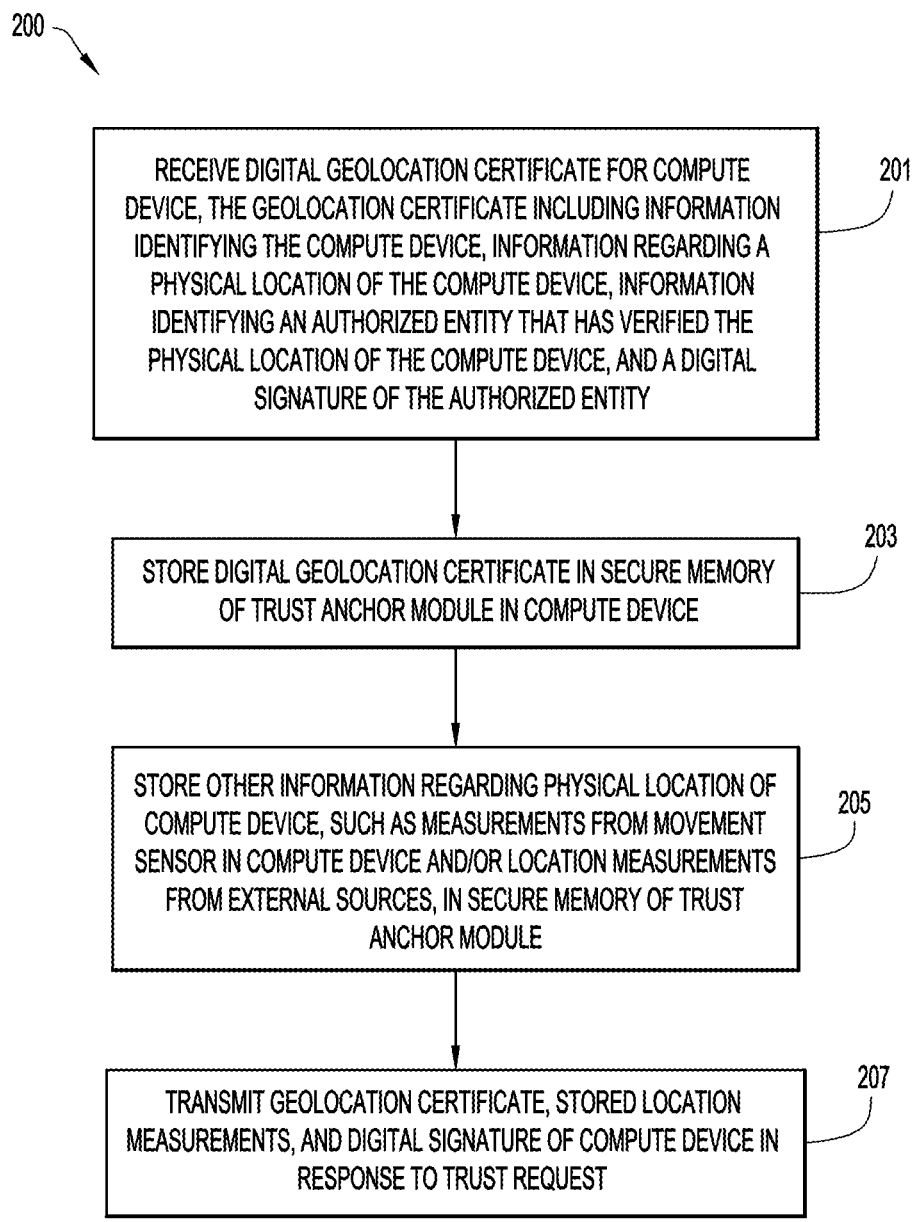
FIG. 3 is a flow chart showing operations of a root-of-trust of geolocation method according to an example embodiment.

FIG. 3 is a flow chart 200 showing operations of a compute device in a root-of-trust of geolocation method according to an example embodiment. In step 201, the compute device receives a digital geolocation certificate. The geolocation certificate may include information identifying the apparatus, information regarding a physical location of the apparatus, information identifying an authorized entity that has verified the physical location of the apparatus, and a digital signature of the authorized entity. In an embodiment, the authorized entity is an authorized representative of an entity that owns or controls the compute device. For example, the authorized entity could be a corporate officer of the entity that owns or controls the compute device.

In one embodiment, the digital geolocation certificate may be received directly from an authorized entity (e.g., via a management portal in communication with the compute device, as shown by solid lines in FIG. 1). In another embodiment, the digital geolocation certificate may be generated by operations of an authorized entity and a certificate authority (e.g., as shown by broken lines in FIG. 1). In the former case, the authorized entity may communicate directly with the compute device via a communications port on the device or via a network interface. In the latter case, the authorized entity can provide information (e.g., identifying the apparatus, information regarding a physical location of the apparatus, information identifying the authorized entity, and a digital signature of the authorized entity) to the certificate authority, and the certificate authority can generate the digital geolocation certificate using the information provided by the authorized entity. In embodiments involving a certificate authority, the certificate authority may be associated with the authorized entity or it may be a trusted third party.

In step 203, the main processor of the compute device causes the trust anchor module to store the geolocation certificate in secure memory of the trust anchor module. In an embodiment, the geolocation certificate is cryptographically bound to the trust anchor module, e.g., with a cryptographic key, so that it cannot be overwritten or modified and can only be removed by an authorized entity.

In step 205, the main processor of the compute device causes the trust anchor to store other information regarding physical location of the compute device, such as measurements from a movement sensor in the compute device and/or location measurements derived from external sources, in secure memory of the trust anchor module. In an embodiment, the main processor may be configured to cause location measurements to be obtained and stored in response to predetermined events (e.g., bootup), at predetermined time intervals, and/or in response to external requests from an authorized entity. In an embodiment, the cryptographic processor in the trust anchor module may be configured to add new location measurements to its secure memory using an extend operation in which the new data is hashed with the existing data in the secure memory. Examples of hash algorithms that can be used include the SHA-1 and SHA-2 hash functions.

In an embodiment, the cryptographic processor in the trust anchor module may be configured to generate a notification and/or reset the trusted anchor module if the movement sensor detects movement that exceeds a predetermined threshold. For example, if the movement sensor is an accelerometer, the cryptographic processor may be configured to generate a notification if the movement sensor detects an acceleration above a predetermined amount. In another example, the movement sensor may measure background RF emissions and the cryptoprocessor may be configured to generate a notification if the amount of background RF emissions changes more than a predetermined amount. The notification may be sent by the main processor to an authorized entity via the network communications unit. In an embodiment, if the cryptographic processor is configured to reset the trust anchor module in response to a movement notification, the signed geolocation certificate may be deleted from secure memory of the trust anchor module. In another embodiment, the events measured by the motion sensor may be added to an event log and subsequently used to verify or prove certain conditions (e.g., that movement of the compute device since insertion of the signed geolocation certificate has remained within acceptable limits).

In embodiments, the main processor may be configured to obtain location measurements using information from external sources, such as trusted ping servers, GPS satellites, and/or cell towers. For example, the main processor may use network latency measurements, and/or triangulation techniques to derive an estimate of the physical location of the compute device based on communications with one or more external sources. Other examples include use of sensors to measure the RF "landscape" and/or the strength of gravity where the compute device is located to establish a baseline and log changes.

In step 207, the main processor receives a trust request via the network interface and forwards the request to the trust anchor module. In an embodiment, the trust request may include a nonce, a request for information about the configuration and physical location of the compute device, and cryptographic credentials to prove that the requester is authorized to receive the requested information. In embodiments, the requester may be the authorized entity that signed the geolocation certificate, an entity associated with the authorized entity (e.g., a system administrator), or a trusted third party (e.g., a certificate authority). In an embodiment, after the trust request is authenticated, the trust anchor module may cause a packet of information (e.g., a trust blob) to be transmitted to the requester. For example, the trust anchor module may send back the nonce it received to ensure freshness of the quote, information about the configuration of the compute device, the stored location measurements, the signed geolocation certificate, a log of events (e.g., dates/times and descriptions of detected motion events, resets, etc.), and the digital signature of the compute device. It will also be appreciated that the main processor may be configured to transmit information such as the signed geolocation certificate and the stored location measurements in response to predetermined events (e.g., bootup), and/or at predetermined time intervals, without first receiving a trust request from an external entity.

Figure 4:
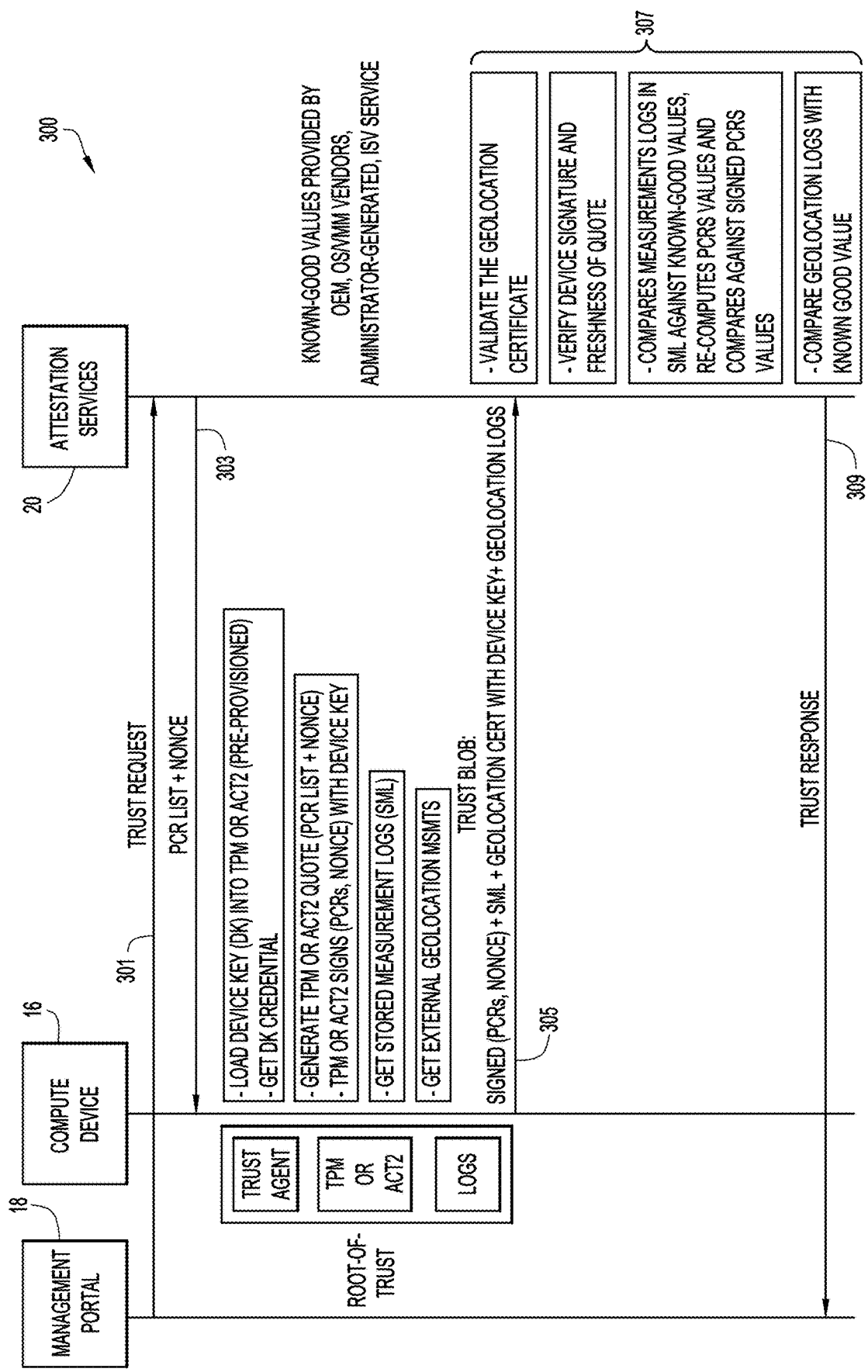
FIG. 4 is a process diagram illustrating trust request and response operations that may be associated with the root-of-trust of geolocation techniques, according to an example embodiment.

FIG. 4 is a process diagram 300 illustrating trust request and response operations that may be associated with the root-of-trust of geolocation techniques, according to an example embodiment. In this example embodiment, the operations are performed by a management portal 18, a compute device 16 with a trust anchor module, and attestation services 20. In the example shown, the compute device 16 includes a trust anchor module in the form of a trusted platform module (TPM) or ACT2. A TPM is a microprocessor with secure memory that stores a public/private keypairs and a data set known as Platform Configuration Registers (PCRs) that comply with standards developed by an organization known as the Trusted Computing Group (TCG). In an embodiment, the TPM is also configured as described herein to store a signed geolocation certificate and physical location measurements derived from communications with external sources (external geolocation measurements) as well as an event log (e.g., storing dates/times and information about movements detected by an onboard sensor, resets, etc.). While a TPM or ACT2 is shown by way of example, it will be appreciated that the root-of-trust of geolocation operations may be performed by any trust anchor module configured as disclosed herein. The management portal 18 and the attestation services 20 in this example may be hosted on the same computing device or on separate computing devices. When the management portal 18 and the attestation services 20 are hosted on separate computing devices, the computing devices may be owned or controlled by the same entity or by different entities. For example, the attestation services 20 may be hosted on a computing device owned or controlled by a trusted a third party.

In step 301, a requester, via a management portal, sends a trust request regarding a particular compute device to the attestation services. For example, the trust request may include an identification of the particular compute device, a request for verification of geolocation of the compute device, and the requester's credentials. In an embodiment, the requester may be an authorized representative of the entity that owns or controls the compute device. In an embodiment, the trust request may be cryptographically signed by the requester to enable authentication by the attestation services or the compute device.

In step 303, after authenticating the trust request, the attestation services sends a communication to the compute device. In an embodiment, the communication may include a PCR list and a nonce, and the requester's credentials.

In step 305, the trust agent in the compute device authenticates the request from the attestation services/requester and prepares a trust blob. For example, the compute device may load a pre-provisioned device key (DK) into the TPM and get the device key credential. The compute device may then generate a trust quote (e.g., a TPM quote) including the PCR list, and the nonce, and cryptographically sign the quote with the device key. In an embodiment, the compute device may also retrieve stored measurement logs (SML) and external geolocation measurements, and generate a trust blob including the signed PCRs and nonce, the SML, the signed geolocation certificate with device key, and the geolocation logs (external geolocation measurements). The compute device then may send the trust blob to the attestation services/requester.

In step 307, the attestation services may validate the geolocation certificate, verify the device signature (e.g., using PKI) and the freshness of the quote (e.g., using the nonce), and may perform comparisons between known good values and the logs it receives from the compute device in order to evaluate trustworthiness of the information in the trust blob received from the compute device. In an embodiment, the known good values may be provided by an original equipment manufacturer (OEM) of the compute device, operating system (OS) vendor, an independent software vendor (ISV) service, an administrator, and/or the authorized entity who signed the geolocation certificate. For example, the attestation services may compare measurement logs in the SML against known good values, re-compute PCRs, and compare the PCRs against the signed PCRs from the compute device. In a further example, the attestation services may compare the geolocation logs from the compute device with the location information in the signed geolocation certificate. In an embodiment, the attestation services may assess whether or not the compute device is in the expected physical location based on a comparison of the geolocation logs and the known good value from the signed geolocation certificate.

In an embodiment, the attestation services may assign weights to the estimated locations in the geolocation logs, based on trustworthiness of the data and methods used to estimate the physical location of the compute device. For example, a weighted sum model can be used in which each measurement is given a weight through a multiplicative (weighting) factor (e.g., a multiplicative factor less than 1). For instance, the signed geolocation certificate could be given a first weighting factor (e.g., 0.75), GPS data could be given a second weighting factor (e.g., 0.60) lower than the first weighting factor (because it may be possible to spoof but fairly difficult), ping response data from trusted servers could be given a third weighting factor (e.g., 0.50) lower than both the first and second weighting factors (because of the nondeterministic behavior of ping latency timings), and WiFi triangulation data (which can easily be spoofed) could be given an even lower weighting factor (e.g., 0.25). In an embodiment, if the measurement exists, it may be given a value of 1 if it agrees with the previous measurements (e.g., the location specified in the geolocation certificate). If the measurement does not agree, it may be given a −1. If the measurement isn't available, it may be given a 0. So if the attestation measurement includes a geolocation certificate, GPS data that agrees, ping responses that agree and WiFi triangulation data that agrees, the formula would be $(1*0.75)+(1*0.60)+(1*0.50)+(1*0.25)=2.1$. However, if all measurements disagree with the geolocation certificate, the measurement would be $(1*0.75)+(-1*0.60)+(-1*0.50)+(-1*0.25)=-0.6$. In an embodiment, even though the geolocation certificate is in place, a business policy may be implemented that rejects the attestation as untrustworthy because the weighted sum is less than a predetermined amount (e.g., less than 0). In another words, the root-of-trust binds the root-of-trust of geolocation signature to a set of measured values (e.g., measurements from the movement sensor and/or measurements from external sources). In an embodiment, policies may be implemented such that, if any value changes, the location information is not trusted (i.e., invalidated).

In step 309, the attestation services sends a trust response to the requester, in this case the management portal. In an embodiment, the trust response may contain the entire compute device attestation status including geolocation information. The attestation status and geolocation information may be summarized in one single trust assertion—e.g., trusted or not trusted. In an embodiment, the trust response can be displayed at the requester's computing device (e.g., in a dashboard). In an embodiment, the trust response may validate or not validate an expected value associated with the compute device. For example, the trust response from the attestation services may validate or confirm that the compute device is in the expected physical location or it may indicate that it was unable to validate or confirm that the compute device is in the expected physical location due to a discrepancy between the expected and measured physical locations. In an embodiment, the attestation services may build up a probable location statement by comparing the claimed geolocation of the device based on the certificate that is stored in the secure hardware to external geolocation measurements to give a probability of accuracy report, such as:

GPS/aGPS Reports: Latitude: 40.74844|Longitude: −73.985655—New York City—Empire State Building
Network Distance Reports: Latitude: 40.735657|Longitude: −74.172367—Newark, N.J.
Secure Root of Trust Stored: Latitude: 51.507351|Longitude: −0.127758—London, England In the above example, the dynamic non-colluding metrics of GPS and Network Distance report location information within 15 miles of each other. The data stored by the authorized entity/corporate officer within the root of trust states London, England as the physical location. Thus, the attestation services may report that the probability of geolocation accuracy is very low (e.g., nearly zero).

In an embodiment, communications to and from the management portal may use a representational state transfer (RESTful) application programming interface (API) using a secure communications protocol such as HTTPS. In an embodiment, communications between the attestation services and the trust agent in the compute device may run over transport layer security (TLS). It will be appreciated that other secure communication protocols can be used.

Thus, it will be appreciated that, in one embodiment, the root-of-trust of geolocation described herein can be combined with existing TPM techniques for asserting software measurements such that what is reported during attestation includes location information along with measured physical characteristics (e.g., measured time from a ping) and/or log information of physical events (e.g., movement as recorded by an accelerometer). Also, it will be appreciated that the basic security concepts behind chaining roots-of-trust can be applied to the root-of-trust of geolocation described herein. Chaining allows components external to the device with the root-of-trust to assert geolocation via a chaining model. For example, external components may assert their geolocation using existing trusted weak methods of geolocation, such as network latency, with reference to the root-of-trust of geolocation of a pinged device.

The root-of-trust of geolocation described herein may also be enhanced by independently measuring the location of two or more devices that are expected to be in the same location. If the measurements for both devices indicate the same location, then (via anti-collusion), the trust in the geolocation is enhanced.

While an example embodiment has been described in which the management portal is used in the attestation process illustrated in FIG. 4, it will be appreciated that trust requests can be sent to the compute device, via the attestation services, from other entities, such as a system administrator, a compliance or auditing entity, a system management or orchestration system, or other entity with appropriate credentials.

In summary, an apparatus is provided comprising a network interface unit configured to enable network communications; a trust anchor module including a cryptographic processor and a secure memory; and a main processor coupled to the network interface unit and the trust anchor module and configured to: receive, via the network interface unit, a digital geolocation certificate, the geolocation certificate including information identifying the apparatus, information regarding a physical location of the apparatus, information identifying an authorized entity that has verified the physical location of the apparatus, and a digital signature of the authorized entity; and cause the trust anchor module to store the digital geolocation certificate in the secure memory such that the digital geolocation certificate is cryptographically bound to the apparatus. The trust anchor module may also include, or otherwise be configured to communicate over a secure channel with, a movement sensor associated with the apparatus. The trust anchor module may take certain actions when measurements from the sensor exceed a predetermined threshold. The apparatus may also obtain estimates of its physical location based on communications with external sources, such as trusted ping servers, GPS satellites, cell towers, and/or wireless access points, and the trusted anchor module may store the location information in geolocation logs that may be provided to an authorized entity, along with the signed geolocation certificate bound to the apparatus, in response to a request or at other times.

In addition, a method of establishing a root of trust of geolocation for an apparatus including a trust anchor module having a cryptographic processor and a secure memory is provided comprising: receiving, at the apparatus, a digital geolocation certificate, the geolocation certificate including information identifying the apparatus, information regarding a physical location of the apparatus, information identifying an authorized entity that has verified the physical location of the apparatus, and a digital signature of the authorized entity; and storing the digital geolocation certificate in the secure memory of the apparatus such that the digital geolocation certificate is cryptographically bound to the apparatus.

Furthermore, a non-transitory computer-readable storage media encoded with software is provided comprising computer executable instructions and when the software is executed operable to: receive, at an apparatus including a trust anchor module having a cryptographic processor and a secure memory, a digital geolocation certificate, the geolocation certificate including information identifying the apparatus, information regarding a physical location of the apparatus, information identifying an authorized entity that has verified the physical location of the apparatus, and a digital signature of the authorized entity; and store the digital geolocation certificate in the secure memory of the apparatus such that the digital geolocation certificate is cryptographically bound to the apparatus.

The above description is intended by way of example only. Although the techniques are illustrated and described herein as embodied in one or more specific examples, it is nevertheless not intended to be limited to the details shown, since various modifications and structural changes may be made within the scope and range of equivalents of the claims.

What is claimed is:

1. An apparatus comprising:
   a network interface unit configured to enable network communications;
   a trust anchor module including a cryptographic processor and a secure memory; and
   a main processor coupled to the network interface unit and the trust anchor module and configured to:
   receive, via the network interface unit, a digital geolocation certificate for the apparatus, the digital geolocation certificate including information identifying the apparatus, information regarding a physical location of the apparatus, information identifying an authorized entity that has verified the physical location of the apparatus, and a digital signature of the authorized entity;
   cause the trust anchor module to store the digital geolocation certificate in the secure memory such that the digital geolocation certificate is cryptographically bound to the apparatus in a manner that renders the digital geolocation certificate immutable; and
   measure a location of the apparatus based on communications with external sources;
   wherein the trust anchor module is configured to store a log of location measurements based on the communications with external sources in the secure memory, wherein the location measurements stored in the log are protected from tampering by only allowing additional location measurements stored in the log to be added, and not to be removed or modified, using a privileged process that is executed by the cryptographic processor, and wherein a trustworthiness associated with a location measurement of the log of location measurements is determined based on a weighted sum of positive weighted values for each external source that agrees with the information regarding the physical location of the apparatus in the digital geolocation certificate and negative weighted values for each external source that disagrees with the information regarding the physical location of the apparatus in the digital geolocation certificate; and
   wherein a configuration of the apparatus is attested to external entities by providing the digital geolocation certificate from the trust anchor module.

2. The apparatus of claim 1, wherein the information regarding the physical location of the apparatus includes longitude and latitude information.

3. The apparatus of claim 1, wherein the trust anchor module further includes a movement sensor, and wherein the trust anchor module is configured to store measurements from the movement sensor in the secure memory.

4. The apparatus of claim 3, wherein the trust anchor module is configured to cause a notification to be sent, via the network interface unit, when a measurement from the movement sensor exceeds a predetermined threshold.

5. The apparatus of claim 3, wherein the movement sensor is an accelerometer.

6. The apparatus of claim 1, wherein the main processor is configured to measure a location of the apparatus by communicating with at least one of GPS satellites, trusted ping servers, or wireless wide area network cell towers.

7. The apparatus of claim 1, wherein the main processor is configured to send the log of location measurements stored in the secure memory to another device in response to a trust request.

8. A system comprising the apparatus of claim 1 and a computing device in communication with the apparatus via a network, the computing device being configured to:
   send to the apparatus, via the network, a communication seeking an assertion of current location and stored measurements;
   receive from the apparatus, via the network, information from the trust anchor module regarding the physical location of the apparatus, the information including the digital geolocation certificate, the log of the location measurements stored in the secure memory of the apparatus, and the digital signature of the apparatus; and
   determine, based on the information received from the apparatus, trustworthiness of the assertion of the current location.

9. The system of claim 8, wherein the computing device is configured to determine trustworthiness of the assertion of the current location by comparing the physical location asserted in the digital geolocation certificate with the log of location measurements.

10. The system of claim 8, wherein the computing device is configured to determine trustworthiness of the assertion of the current location based on whether or not a stored movement measurement exceeds a predetermined threshold.

11. A method of establishing a root of trust of geolocation for an apparatus including a trust anchor module having a cryptographic processor and a secure memory, the method comprising:
   receiving, at the apparatus, a digital geolocation certificate for the apparatus, the digital geolocation certificate including information identifying the apparatus, information regarding a physical location of the apparatus, information identifying an authorized entity that has verified the physical location of the apparatus, and a digital signature of the authorized entity;
   storing the digital geolocation certificate in the secure memory of the apparatus such that the digital geolocation certificate is cryptographically bound to the apparatus in a manner that renders the digital geolocation certificate immutable;
   measuring a location of the apparatus based on communications with external sources; storing a log of location measurements based on the communications with external sources in the secure memory, wherein the location measurements stored in the log are protected from tampering by only allowing additional location measurements stored in the log to be added, and not to be removed or modified, using a privileged process that is executed by the cryptographic processor, and wherein a trustworthiness associated with a location measurement of the log of location measurements is determined based on a weighted sum of positive weighted values for each external source that agrees with the information regarding the physical location of the apparatus in the digital geolocation certificate and negative weighted values for each external source that disagrees with the information regarding the physical location of the apparatus in the digital geolocation certificate; and attesting to a configuration of the apparatus to external entities by providing the digital geolocation certificate from the trust anchor module.

12. The method of claim 11, further comprising storing, in the secure memory, measurements from a movement sensor associated with the apparatus.

13. The method of claim 12, wherein the apparatus is connected to an external computing device via a network connection, and further comprising sending a notification that the apparatus has been moved when the measurements from the movement sensor exceed a predetermined value.

14. The method of claim 11, further comprising sending, from the apparatus to another device, the digital geolocation certificate and the log of location measurements stored in the secure memory.

15. A non-transitory computer-readable storage media encoded with software comprising computer executable instructions and when the software is executed operable to:
receive, at an apparatus including a trust anchor module having a cryptographic processor and a secure memory, a digital geolocation certificate for the apparatus, the digital geolocation certificate including information identifying the apparatus, information regarding a physical location of the apparatus, information identifying an authorized entity that has verified the physical location of the apparatus, and a digital signature of the authorized entity;
store the digital geolocation certificate in the secure memory of the apparatus such that the digital geolocation certificate is cryptographically bound to the apparatus in a manner that renders the digital geolocation certificate immutable;
measure a location of the apparatus based on communications with external sources; store a log of location measurements based on the communications with external sources in the secure memory, wherein the location measurements stored in the log are protected from tampering by only allowing additional location measurements stored in the log to be added, and not to be removed or modified, using a privileged process that is executed by the cryptographic processor, and wherein a trustworthiness associated with a location measurement of the log of location measurements is determined based on a weighted sum of positive weighted values for each external source that agrees with the information regarding the physical location of the apparatus in the digital geolocation certificate and negative weighted values for each external source that disagrees with the information regarding the physical location of the apparatus in the digital geolocation certificate; and attest to a configuration of the apparatus to external entities by providing the digital geolocation certificate from the trust anchor module.

16. The computer-readable storage media of claim 15, further comprising instructions operable to store, in the secure memory, measurements from a movement sensor associated with the apparatus.

17. The computer-readable storage media of claim 16, further comprising instructions operable to send a notification that the apparatus has been moved when the measurements from the movement sensor exceed a predetermined value.

18. The computer-readable storage media of claim 15, further comprising instructions operable to send, from the apparatus to another device, the digital geolocation certificate and the log of location measurements stored in the secure memory.

19. The system of claim 8, wherein the computing device is further configured to determine compliance with at least one policy or legal requirement based on the location of the apparatus.

20. The method of claim 13, wherein the external computing device is further configured to determine compliance with at least one policy or legal requirement based on the location of the apparatus.

21. The computer-readable storage media of claim 16, further comprising instructions operable to determine compliance with at least one policy or legal requirement based on the location of the apparatus.

* * * * *